(12) United States Patent
Crandall

(10) Patent No.: US 7,360,779 B2
(45) Date of Patent: Apr. 22, 2008

(54) ROLL FORMED STEP RAIL FOR A VEHICLE

(76) Inventor: Robert T. Crandall, 18862 Hideaway Dr., Yorba Linda, CA (US) 92886

(*) Notice: Subject to any disclaimer, the term of this patent is extended or adjusted under 35 U.S.C. 154(b) by 89 days.

(21) Appl. No.: 11/304,493

(22) Filed: Dec. 14, 2005

(65) Prior Publication Data
US 2007/0126201 A1 Jun. 7, 2007

Related U.S. Application Data

(60) Provisional application No. 60/741,522, filed on Dec. 1, 2005.

(51) Int. Cl.
- B60R 3/00 (2006.01)
- B60C 9/00 (2006.01)
- B62D 25/18 (2006.01)
- F16B 7/04 (2006.01)
- A47B 96/06 (2006.01)
- F21V 21/00 (2006.01)
- A47F 5/08 (2006.01)

(52) U.S. Cl. .............. 280/163; 280/848; 280/175; 280/164.1; 280/164.2; 403/13; 403/14; 403/408.1; 248/217.3; 248/226.11; 248/231.9; 248/231.91

(58) Field of Classification Search ........... 280/163, 280/848, 157, 164.1, 164.2; 403/13, 14, 403/408.1; 248/217.3, 226.11, 231.9, 231.91
See application file for complete search history.

(56) References Cited

U.S. PATENT DOCUMENTS

| | | | | |
|---|---|---|---|---|
| 3,036,673 A | * | 5/1962 | Santerre | ............ 49/463 |
| 4,463,962 A | * | 8/1984 | Snyder | ............ 280/164.1 |
| 4,557,494 A | * | 12/1985 | Elwell | ............ 362/495 |
| 6,588,782 B2 | * | 7/2003 | Coomber et al. | ............ 280/163 |
| 6,595,479 B2 | * | 7/2003 | Johnson et al. | ............ 248/343 |
| 7,168,721 B2 | * | 1/2007 | Mulder | ............ 280/163 |
| 2003/0011163 A1 | * | 1/2003 | Coomber et al. | ............ 280/163 |
| 2006/0163835 A1 | * | 7/2006 | Mulder | ............ 280/163 |

OTHER PUBLICATIONS

Mid-America Automotive Products, Inc. ("MAAP"); "Product Catalog 2005"; catalog; 2005; 12 pages; MAAP; Sapulpa, OK.
Christian Vila Kuid; "AE 510, Research Project 1 Cold Extrusion"; research project; Oct. 22, 2002; 14 pages; http://www.engr.ku.edu/~rhale/ae510/websites_f02/extrusion.doc.

* cited by examiner

Primary Examiner—Christopher P. Ellis
Assistant Examiner—John R. Olszewski
(74) Attorney, Agent, or Firm—Howison & Arnott, L.L.P.

(57) ABSTRACT

A roll formed step rail for a vehicle comprises an elongated rail body including a continuous rail wall of substantially uniform thickness. The rail wall describes a continuous cross-sectional profile between two elongated free edges, the cross-sectional profile of the rail being substantially uniform along the length of the rail body. The cross-sectional profile of the rail body includes a relatively flat top portion disposed between a substantially semi-circular front curved portion and a substantially quarter-circular rear curved portion. A rear mounting lip extends forward from the rear curved portion to one of the elongated free edges. A front mounting lip extends upward and then rearwards from the front curved portion to another of the elongated free edges. The elongated free edges are generally in line with one another, but spaced apart to define a longitudinal channel therebetween having a predetermined width. The rail body is formed from a sheet of material by a process of roll forming.

10 Claims, 14 Drawing Sheets

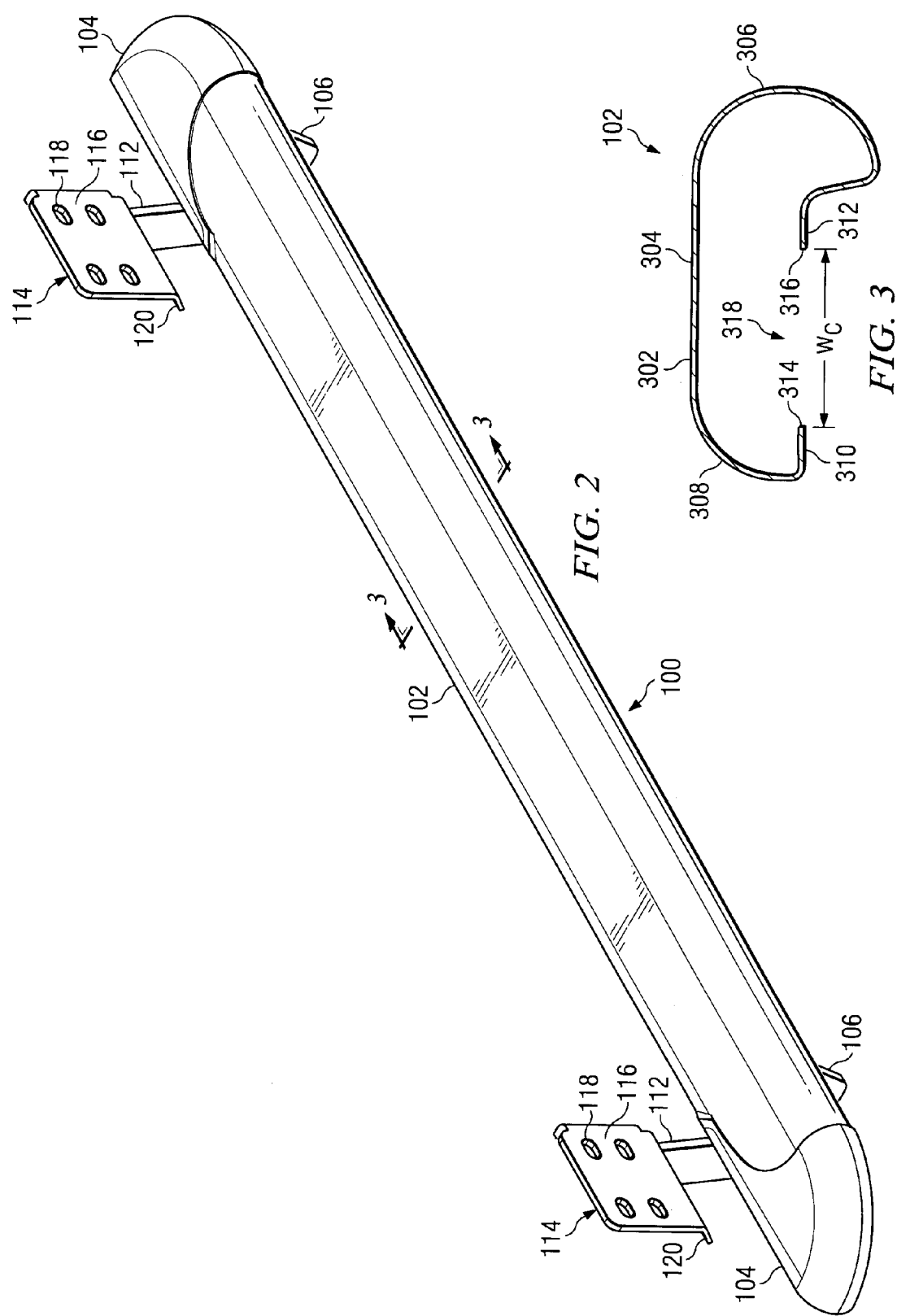

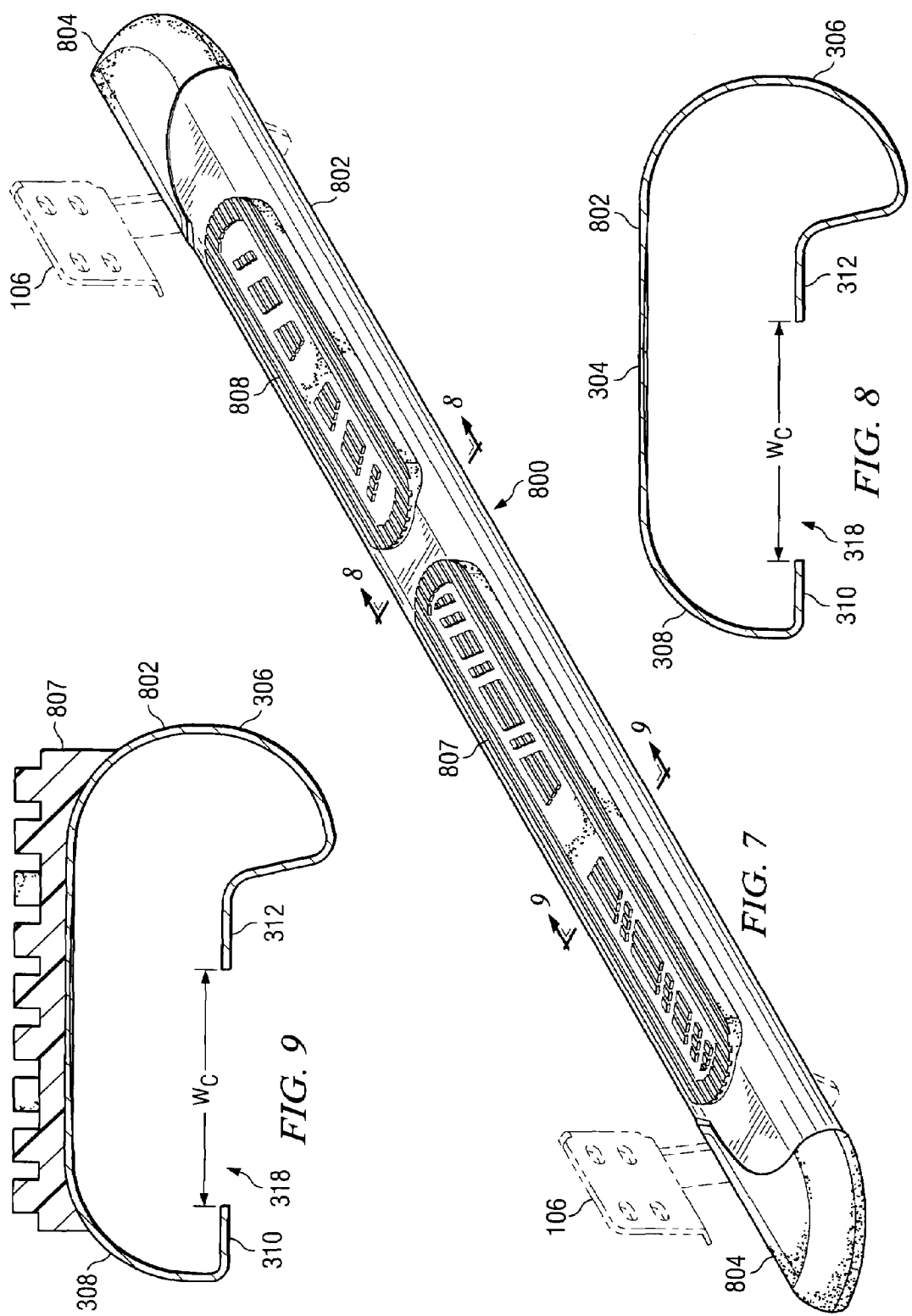

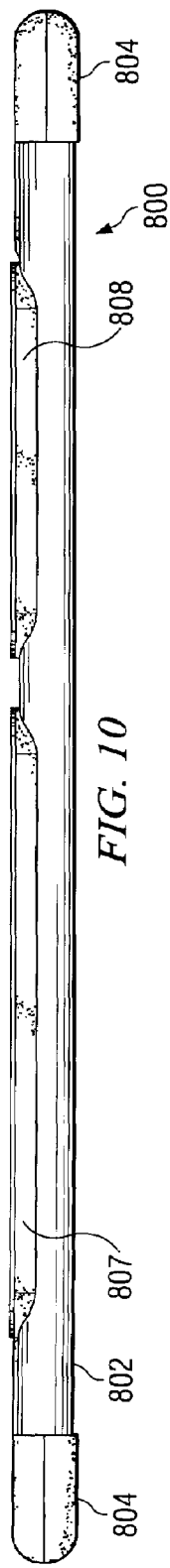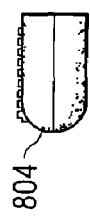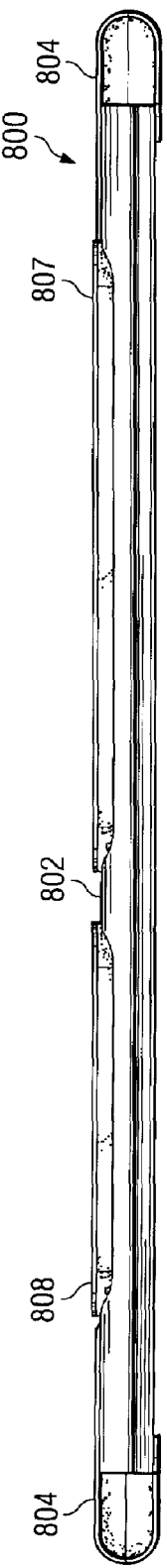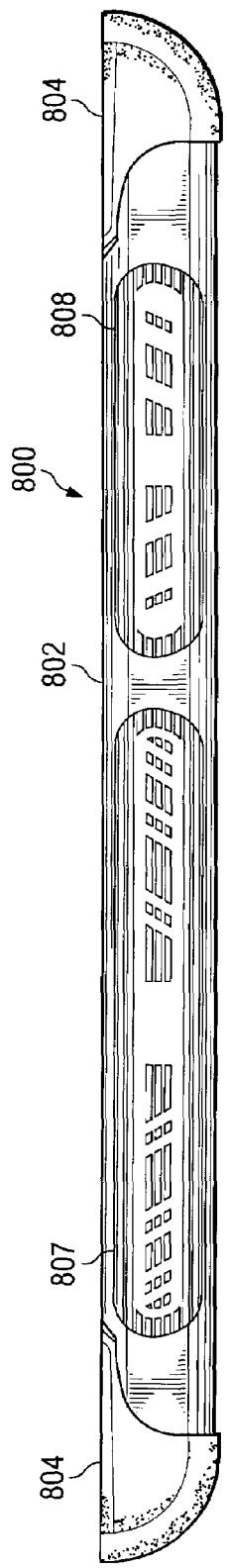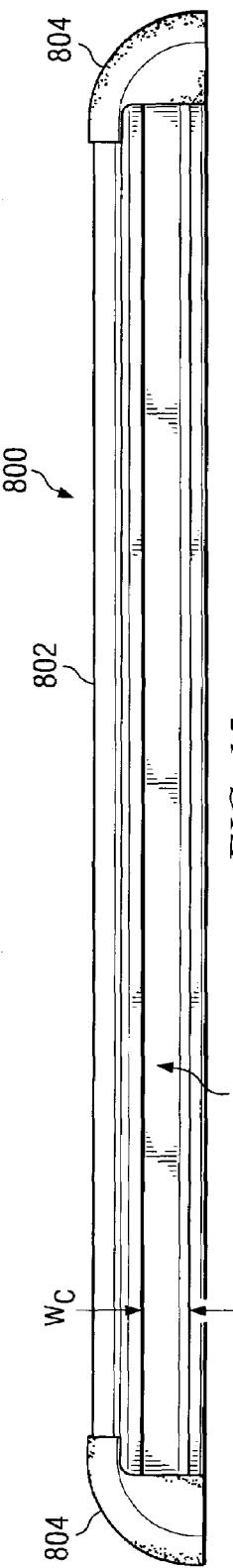

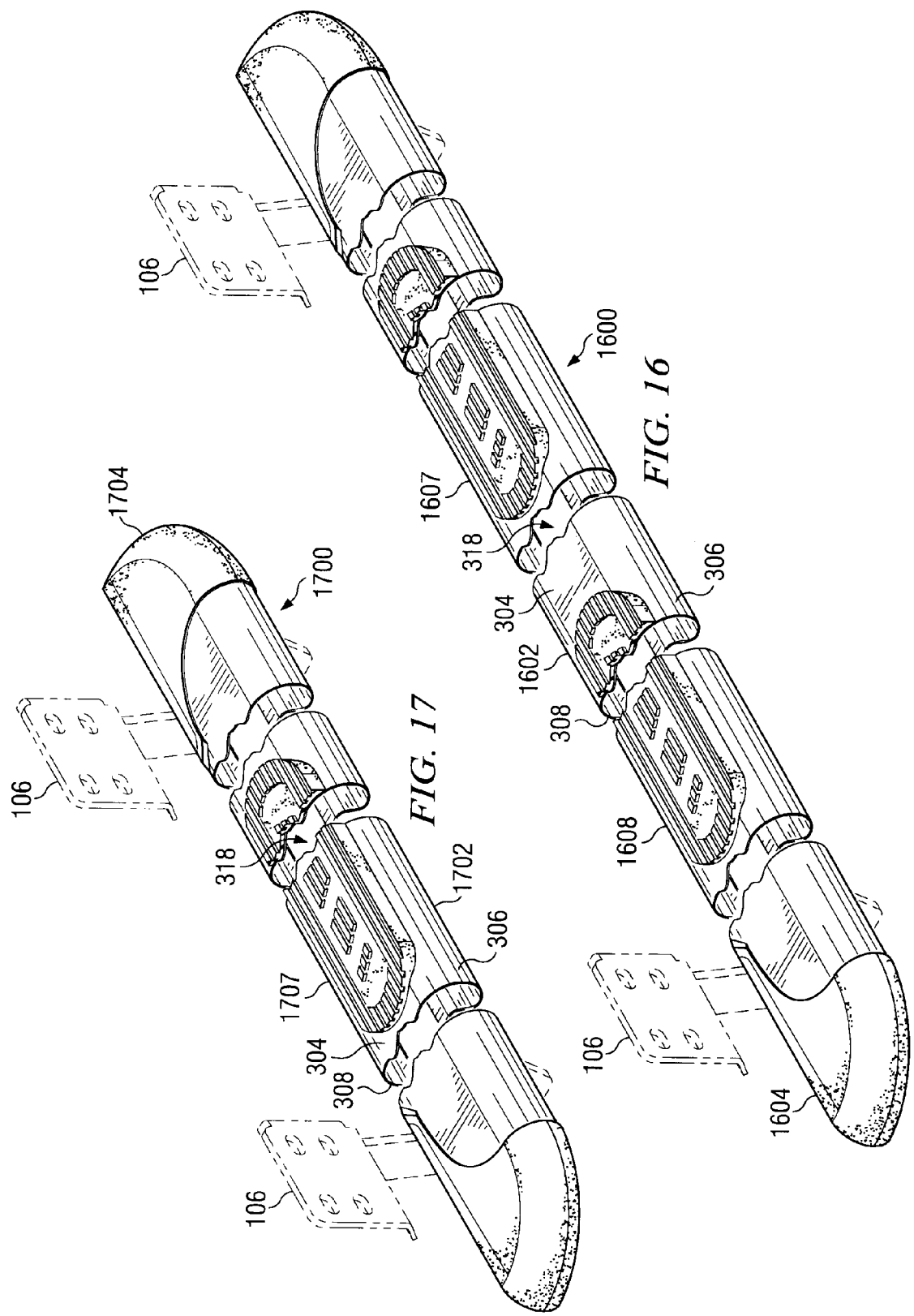

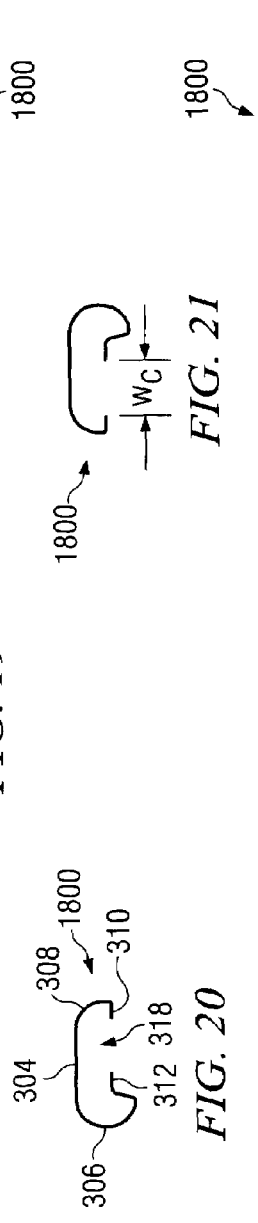
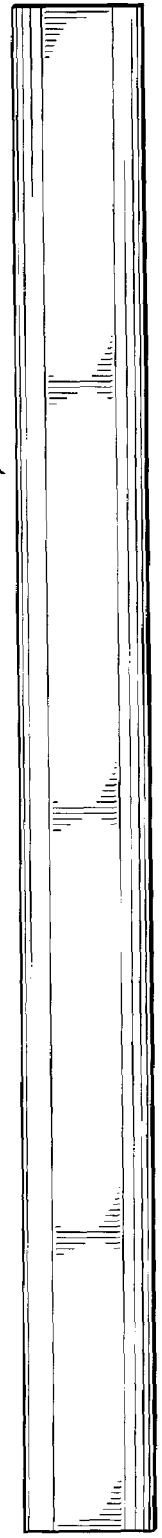
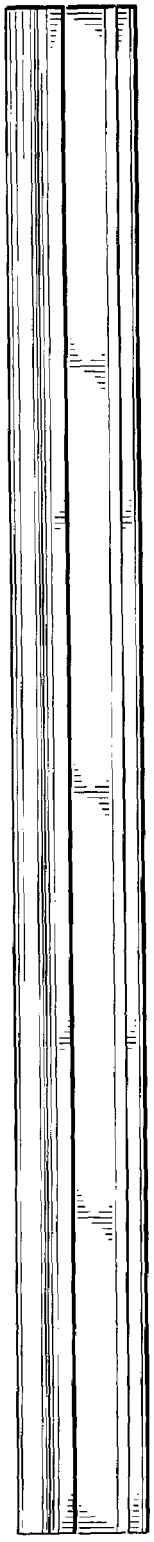
FIG. 19
FIG. 20
FIG. 21
FIG. 22
FIG. 23
FIG. 24

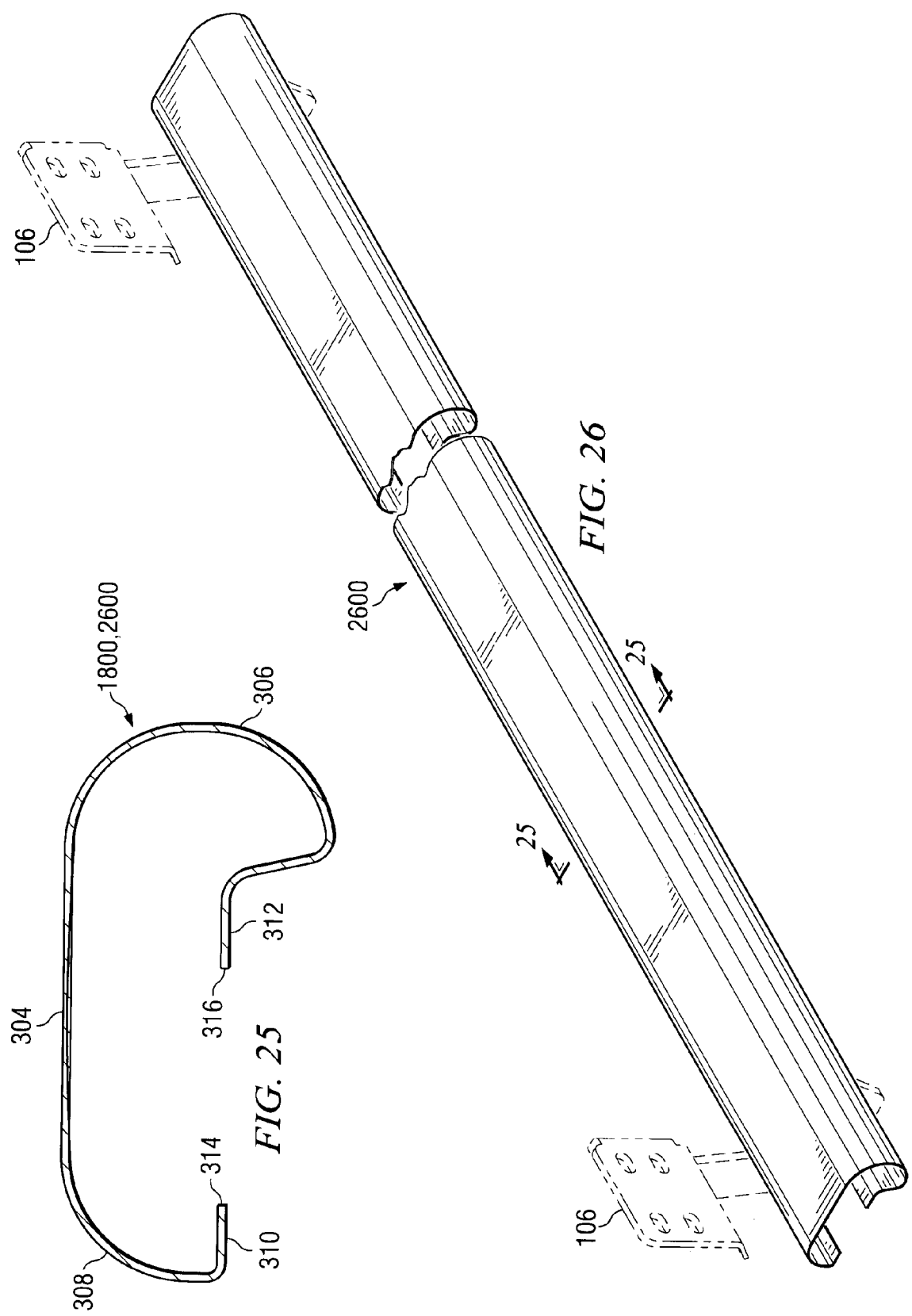

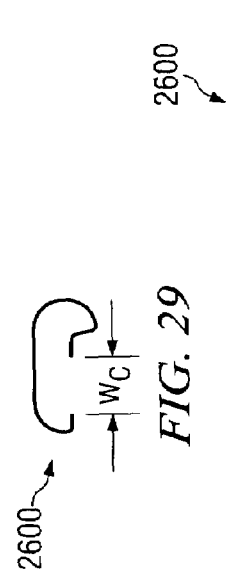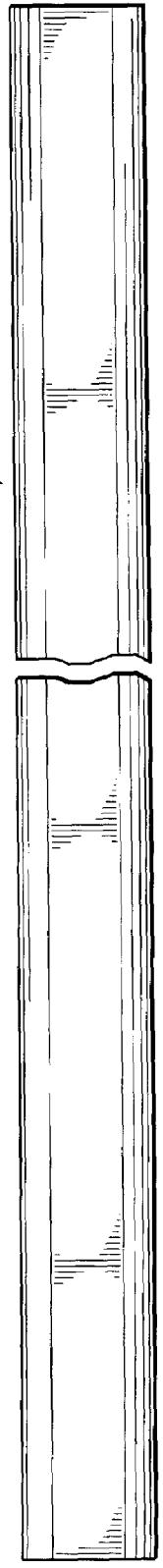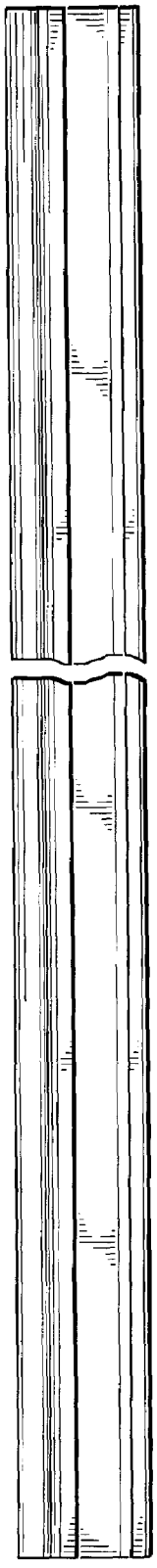
FIG. 27
FIG. 28
FIG. 29
FIG. 30
FIG. 31
FIG. 32

ROLL FORMED STEP RAIL FOR A VEHICLE

CROSS-REFERENCE TO RELATED APPLICATIONS

This application claims the benefit of priority from U.S. Provisional Application No. 60/741,522 filed Dec. 1, 2005.

TECHNICAL FIELD OF THE INVENTION

This invention is related to automotive vehicle body/chassis accessories such as running boards, side bars and tube steps, and more particularly, to step rails manufactured using a roll forming process for mounting on the sides of vehicles such as pickup trucks and sport utility vehicles.

BACKGROUND OF THE INVENTION

It is well known to mount body/chassis accessories such as running boards, side bars or tube steps (referred to collectively herein as "step rails") below the side doors of automotive vehicles such as pickup trucks and sport utility vehicles (SUVs) to provide a convenient step for use when entering/exiting the vehicle and for protection of the vehicle against side body damage. In addition, these step rails frequently serve as styling members intended to personalize or enhance the appearance of the vehicle. As such, both the mechanical strength properties and the external appearance properties of step rails are important. Further, since step rails are exposed to the rain, ice, mud, road chemicals (e.g., salt) and other harsh environmental materials, it is desirable that they be resistant to corrosion and/or surface finish degradation.

Conventional step rails are typically formed by bending tubular metal stock (e.g., where a tubular cross section is desired), by stamping flat metal blanks (e.g., where irregular, concave and/or convex surface features are desired), or by metal extrusion (e.g., where a constant cross section is desired). Commonly used materials for bending and stamping include steels, stainless steels and aluminum alloys, whereas extrusion in typically restricted to aluminum alloys. Ordinary steel step rails are typically painted, chrome plated, or powder coated to provide corrosion resistance and an attractive appearance. Stainless steel and aluminum alloy step rails may be left bare since those materials are inherently corrosion resistant, however, they are often polished to produce a reflective (i.e., "mirror") finish or brushed to produce a matte (i.e., "brushed") finish. Less frequently, they may also be painted or powder coated.

It will be appreciated that it is typically much easier (an hence, less expensive) to produce a high quality, uniform surface finish on basic metal stock (e.g., straight tubes, flat sheets, etc.) than it is on complex shapes such as a formed step rail. This is especially true in the case of bare metal finishes such as mirror and brushed finishes. Thus, it is desirable that the surface finish be applied to the basic metal stock before forming. However, the bending, stamping and extrusion processes conventionally used in forming step rails tend to mar, distort or otherwise damage the surface finish during forming. For low quality parts, such damage may be acceptable, given the savings in manufacturing costs. But for top-quality parts, even minor surface finish imperfections may cause the part to be rejected. Thus, the cost savings achieved by pre-finishing the stock may be lost due to a high defect rate in the finished product. A need therefore exists for a high quality formed step rail made from pre-finished stock using a process that will preserve the original high quality surface of the stock in the finished product.

It will also be appreciated that step rails must be strong enough to support the loads imposed upon them (e.g., the weight of passengers on the step) without failing, and be stiff enough to avoid undue deflection ("flexing") and/or vibration during use. At the same time, it is desirable to minimize the overall weight and amount of material used in the step rail for performance and cost reasons. A need therefore exists for a formed step rail having a structural configuration that is relatively efficient, i.e., producing high strength and stiffness for the amount of material used.

After fabrication, the step rails must be mounted on the vehicle. This is typically accomplished through the use of bracket systems designed for the particular step rail/vehicle combination. However, ordinary variation in the location of the mounting holes provided on the vehicle by its manufacturer can sometimes make it difficult to install and adjust the step rails without requiring "field modification" of the bracket system and/or step rail itself. Such modifications are undesirable as they introduce additional complexity (and hence, additional cost) to the step rail mounting. Further, if done improperly, such modifications may also affect the structural integrity of the step rail. A need therefore exists for a bracket system which provides for uncomplicated installation and adjustment of the step rails even in the face of normal variation in vehicles.

While necessary for mounting the step rail to the vehicle, the bracket system is typically not considered a styling member. A need therefore exists for a step rail/bracket system combination which conceals as much of the bracket system as possible when viewed from normal viewing angles.

SUMMARY OF THE INVENTION

The present invention disclosed and claimed herein comprises, in one aspect thereof, a roll formed step rail for a vehicle including an elongated rail body having a continuous rail wall of substantially uniform thickness. The rail wall describes a continuous cross-sectional profile between two elongated free edges, the cross-sectional profile of the rail being substantially uniform along the length of the rail body. The cross-sectional profile of the rail body includes a relatively flat top portion disposed between a substantially semi-circular front curved portion and a substantially quarter-circular rear curved portion. A rear mounting lip extends forward from the rear curved portion to one of the elongated free edges. A front mounting lip extends upward and then rearwards from the front curved portion to another of the elongated free edges. The elongated free edges are generally in line with one another, but spaced apart to define a longitudinal channel therebetween having a predetermined width. The rail body is formed from a sheet of material by a process of roll forming.

The present invention disclosed and claimed herein comprises, in another aspect thereof, a step rail assembly for a vehicle. The assembly includes an elongated rail body having two opposing edges defining a longitudinal channel. At least one mounting bracket is provided having a first and a second end connected by a bracket arm. The first end is adapted for a rigid connection to a mounting point of the vehicle. The second end has a generally upwardly-facing, generally flat mounting surface defining a first fastening hole and a first portion of an alignment device. A pinch clamp is provided having a major dimension and a minor dimension disposed on generally perpendicular axes. The pinch clamp defines a second fastening hole and a second portion of the alignment mechanism. The major dimension is greater than a width of the longitudinal channel, and the minor dimension is less than the width of the longitudinal channel. The second portion of the alignment device is adapted to selectively engage the first portion and thereby prevent relative rotation between the mounting bracket and the pinch clamp when the minor dimension of the pinch clamp is substantially aligned with the longitudinal channel. The rail body can be rigidly connected to the mounting bracket by first loosely inserting a fastener through the respective fastening holes in the mounting surface and the pinch clamp to rotatably attach the pinch clamp to the mounting bracket, then turning the pinch clamp to align the major axis with the longitudinal channel, then lowering the rail body toward the mounting bracket such that the pinch clamp passes between the opposing edges of the rail body and the opposing edges come into contact with the mounting surface, then rotating the pinch clamp to align the major axis perpendicular to the longitudinal channel such that the clamp overlies the opposing edges of the rail body and the first portion of the alignment device engages the second portion, and then tightening the fastener to pull the pinch clamp and flat face portion of the bracket arm tightly against opposite sides of the opposing edges of the rail body.

The present invention disclosed and claimed herein comprises, in a further aspect thereof, a method of forming a step rail of predetermined length for a vehicle. A quantity of flat-rolled metal is provided having an overall length and a substantially finished surface on at least one side. The substantially finished surface has a layer of protective plastic film adhering thereto. The flat-rolled metal is prepared for roll forming while retaining the layer of protective plastic in place on the substantially finished surface. The flat-rolled metal is roll formed into a rail body of essentially constant cross section by feeding the metal between successive pairs of rolls that increasingly shape it until the desired cross section is completed. The cross section of the rail body has a non-linear, open contour in which the two ends of the shape are not brought together and the rail body has the substantially finished surface facing outward. The roll formed rail body is then trimmed to the predetermined length and the layer of protective plastic film is removed from the substantially finished surface.

BRIEF DESCRIPTION OF THE DRAWINGS

For a more complete understanding of the present invention and the advantages thereof, reference is now made to the following description taken in conjunction with the accompanying Drawings in which:

FIG. 2 is an enlarged perspective view of the step rail of FIG. 1 and portions of the bracket system;

FIG. 3 is a cross-sectional view of the step rail taken along line 3-3 of FIG. 2;

FIG. 7 is a is a perspective view of a side step rail for a vehicle showing another embodiment of the invention;

FIG. 8 is cross-sectional view thereof taken along line 8-8 of FIG. 7;

FIG. 9 is cross-sectional view thereof taken along line 9-9 of FIG. 7;

FIG. 10 is a front elevation view thereof;

FIG. 11 is a right end view thereof;

FIG. 12 is a left end view thereof;

FIG. 13 is a rear elevation view thereof;

FIG. 14 is a top plan view thereof;

FIG. 15 is a bottom plan view thereof;

FIG. 16 is a perspective view of a side step rail for a vehicle showing another embodiment of the invention, the cross-sectional, elevation and plan views thereof being substantially similar to those of FIG. 7;

FIG. 17 is a perspective view of a side step rail for a vehicle showing yet another embodiment, the cross-sectional, elevation and plan views thereof being substantially similar to those of FIG. 7;

FIG. 19 is a front elevation view thereof;

FIG. 20 is a right end view thereof;

FIG. 21 is a left end view thereof;

FIG. 22 is a rear elevation view thereof;

FIG. 23 is a top plan view thereof;

FIG. 24 is a bottom plan view thereof;

FIG. 25 is an enlarged cross-sectional view thereof taken along line 25-25 of FIG. 18, and further is an enlarged cross-sectional view of the embodiment of FIG. 26 taken along line 25-25 of FIG. 26;

FIG. 26 is a perspective view of a step rail for a vehicle showing another embodiment;

FIG. 27 is a front elevation view thereof;

FIG. 28 is a right end view thereof;

FIG. 29 is a left end view thereof;

FIG. 30 is a rear elevation view thereof;

FIG. 31 is a top plan view thereof;

FIG. 32 is a bottom plan view thereof;

DETAILED DESCRIPTION OF THE INVENTION

Figure 1:
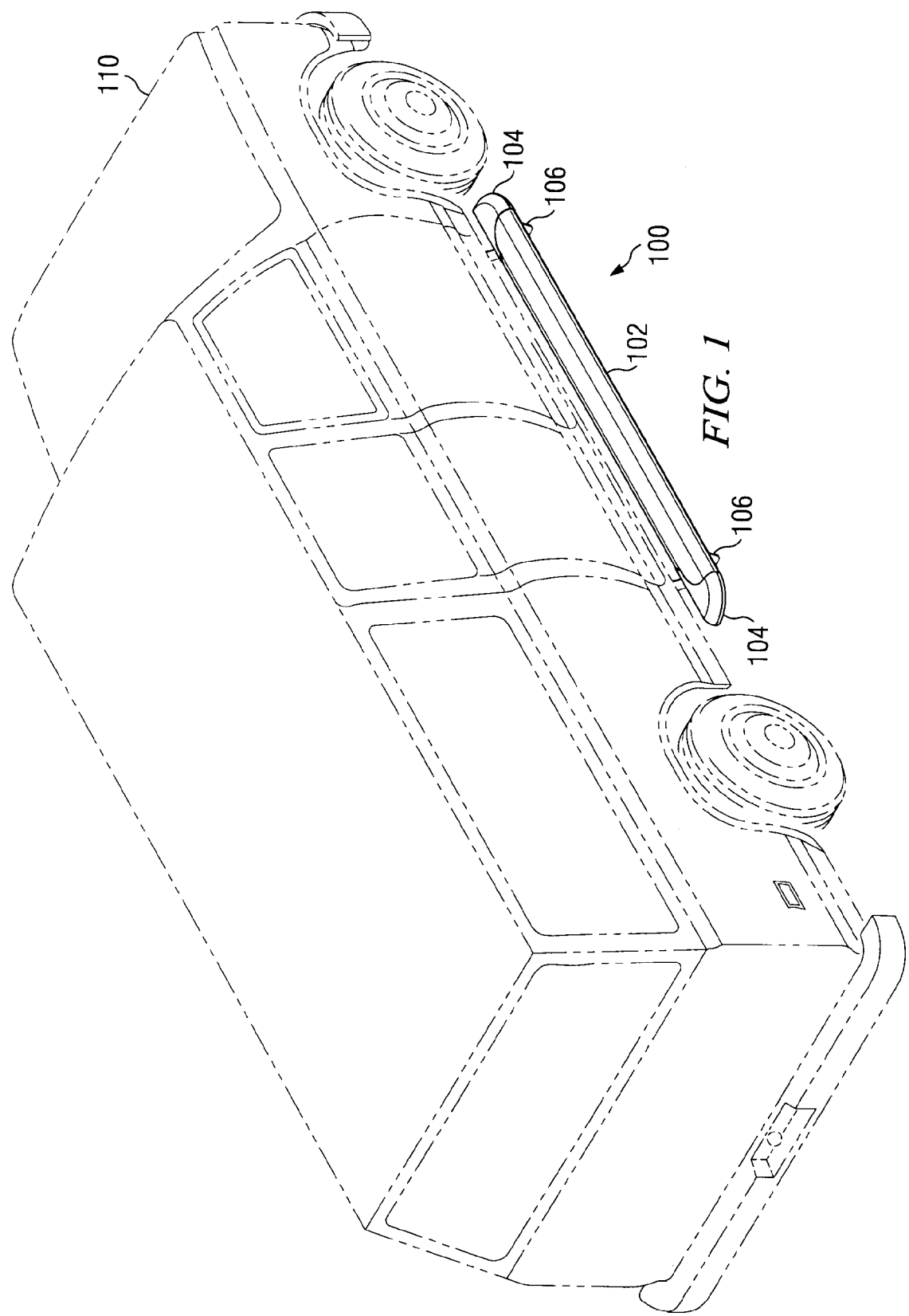
FIG. 1 is a perspective view of a step rail in accordance with one embodiment of the invention, mounted on a SUV (shown in phantom)

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated one embodiment of a roll formed step rail for a vehicle in accordance with the current invention. The step rail 100 includes a rail body 102 and end caps 104. A bracket system 106 is used to attach the step rail 100 to the side of the vehicle 110 (shown in phantom). The bracket system 106 is normally not visible from a perspective view such as shown in FIG. 1 but has been shown here for purposes of illustration. The specific location and appearance of the bracket system 106 relative to the rail body 102 is shown in greater detail herein. Additionally, while not shown in the embodiment of FIG. 1, step pads may also be attached to an upper surface of the step rail 100 as further described herein.

Referring now to FIG. 2, there is illustrated an enlarged view of the step rail 100. The mounting brackets 106 include a bracket arm 112 having an upper bracket plate 114 adapted for attachment to a vehicle body. As stated with respect to FIG. 1, the bracket system 106 is not normally visible from a perspective view, but has been shown as visible in FIG. 2 for purposes of illustration. In this embodiment, the upper bracket plate 114, includes an upper portion 116, having a plurality of mounting holes 118 and a lower portion 120 that is angled with respect to the upper portion 116. The lower portion 120 may be angled to provide a proper fit to a vehicle frame or sub-frame, to provide additional clearance for the rail body 102 or a user of the system, or for aesthetic reasons.

Referring now to FIG. 3, there is illustrated a cross sectional view of the rail body 102 taken through line 3-3 of FIG. 2. The rail body 102 has a relatively thin rail wall 302 that has been formed, preferably by roll forming, into a specialized curve profile as shown. The profile includes relatively flat top portion 304 disposed between a semi-circular front curved portion 306 and a quarter-circular rear curved portion 308. A rear mounting lip 310 extends forward from the rear curved portion 308. A front mounting lip 312, extends upward and then rearwards from the front curved portion 306. The respective free ends 314 and 316 of the rear and front mounting lips 310 and 312 are generally in line with one another, but spaced apart to define a longitudinal mounting passage 318 having a predetermined width, denoted $W_c$.

The rail body 102 is preferably formed of stainless steel material but may be formed of other steel alloys and/or aluminum alloys. The outer surfaces of the rail body 102 are preferably polished or finished to have a specific surface finish as further described herein. The rail body 104 profile is a preferably formed by the process of roll forming. It will be appreciated that roll forming involves passing flat rolled metal sheet stock through successive pairs of rolls that increasingly shape the originally flat stock into a desired cross section as shown. In a preferred embodiment of the invention, the flat rolled stock has a surface that is pre-finished and is rolled in such a manner that the original surface finish is not damaged by the rolling operation. Thus, after roll forming, the rail body 102 will require little, if any, additional surface finishing to achieve the final desired finish. In a more preferred embodiment, the original flat rolled metal stock has a layer of protective plastic film in place on the substantially finished surface. This protective plastic film remains in place during the roll forming operation. After the rail body 102 profile has been fully formed, the protective plastic may be removed. This protective plastic film helps maintain the substantially finished surface of the original stock in good condition during roll forming.

It will be appreciated that the flat rolled metal stock used for the roll forming operation may start out as coiled metal rolls or as flat sheets. Whether coiled rolls or flat sheets, the flat stock will be fed through the roll forming operation in a continuous manner and the rail bodies 102 may be trimmed to their final shape after the rolled form contour has been produced. After trimming to final shape, the end caps 104 and step pads (if used) may be added to the rail body. The end caps 104 and/or step pads will typically be formed of molded plastic, rubber, or resin, however they may be made of die-cast metal or other materials in some embodiments.

Figures 4A, 4B:
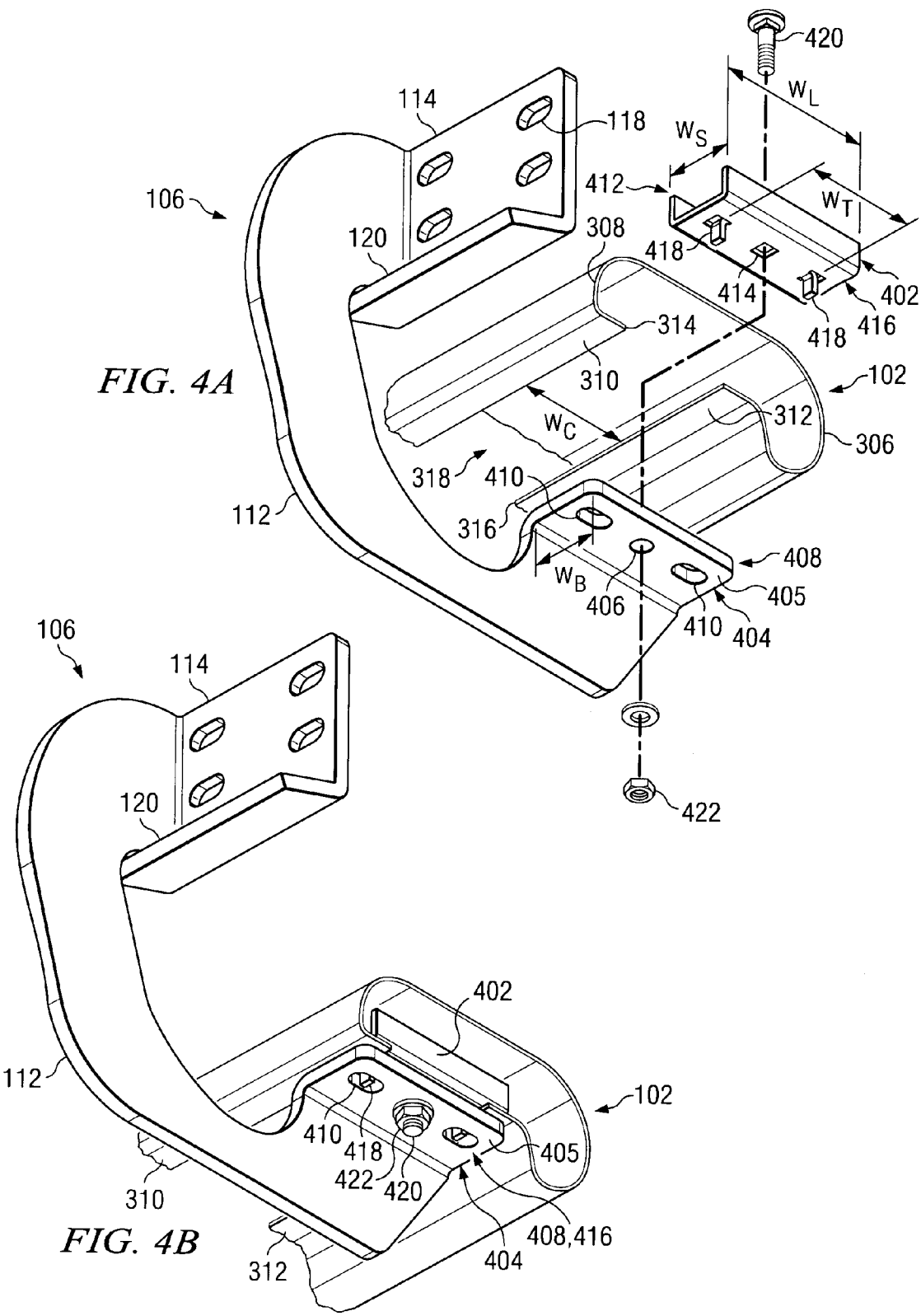
FIG. 4A is an exploded perspective view of the unassembled step rail and bracket system in accordance with another embodiment.
FIG. 4B is a perspective view of the assembled step rail and bracket system of FIG. 4*a;*

Referring now to FIGS. 4A and 4B, there is illustrated enlarged views of the rail mounting bracket system in accordance with further embodiments of the invention. As seen in FIG. 4A, the mounting bracket system includes the rail body 102, bracket 106, and a pinch clamp 402. The bracket 106 includes an arm 112 having an upper plate 114 at the upper end and a lower plate 404 at the lower end as previously described. The lower plate 404 has a body 405 defining a fastener hole 406 and a first part 408 of an alignment device. In this case, the first part 408 of the alignment device comprises a pair of holes 410 formed in the body 405. The pinch clamp 402 has a body 412 having a major dimension with a relatively large width, denoted $W_L$, and a minor dimension with a relatively short width, denoted $W_s$, that is shorter than $W_L$. In the embodiment shown, the pinch clamp body 412 has a generally rectangular shape, but this is not required. Rather, it is only required that the pinch clamp body have a major and minor dimension which are different from one another. The pinch clamp 402 further includes a fastener hole 414 and a second part 416 of the alignment device previously mentioned (i.e., the one having a first part 408 on the lower bracket plate body 405). In the embodiment shown, the second part 416 of the alignment device comprises a pair of tabs 418 extending downward from the lower face of the pinch clamp body 412.

The mounting bracket system of the current invention allows for a method of convenient installation of the rail body 102 to the vehicle. The mounting bracket 106 is first mounted to the vehicle using the top mounting bracket 114. The top mounting bracket 114 may be configured to cooperate with pre-existing hold in the frame or sub-frame of a vehicles. In some instances it may be necessary that hole be drilled into the frame or sub-frame in the desired location to accommodate the mounting bracket 114. When the bracket 114 is mounted, a fastener, such as a nut and bolt combination 420 and 422 may be inserted through the fastening holes 414 and 406 and loosely attached to one another to rotatably attach the pinch clamp 402 to the mounting bracket 106. The pinch clamp 402 may then be turned relative to the mounting bracket top plate 404 until the major dimension with length $W_L$ is aligned with the longitudinal channel 318 between the ends 314 and 316 of the rail body 102. Because the fastener 420, 422 is only loosely fastened, the pinch clamp 402 can be lifted slightly from the surface of plate 404 to keep the first and second portions of the alignment device (in this case, tabs 418 and holes 410) from engaging.

The major dimension of the pinch clamp 402 with length $W_L$ is selected to be larger than the width $W_c$ of the rail body channel 318, and the minor dimension with length $W_s$ is selected to be smaller than the width $W_c$. The major dimension and minor dimension are generally perpendicular to one another. Thus, when the major dimension having length $W_L$ is aligned with the longitudinal channel 318, the minor dimension having length $W_s$ will be able to pass through the longitudinal channel 318 which has a width $W_c$. In a preferred embodiment, the tabs 418 on the pinch clamp 402 are spaced a part by a width, denoted $W_t$, only slightly larger than the width, denoted $W_b$, of the lower plate body 405. This will cause the pinch clamp 402 to remain aligned with the major dimension having length $W_L$ aligned with the channel 318 without being held in this position. The rail 102 may then be lowered over the pinch clamp until the front and rear lips 310 and 312 of the rail rest upon the top of the body 405. The pinch clamp 402 can then be raised slightly to disengage the tabs 418 from the sides of the body 405 and rotated 90 degrees until the major dimension $W_L$ is generally perpendicular to the channel 318. The two portions of the alignment device may then engage (i.e., tabs 418 will fall into holes 410, maintaining the pinch clamp in position). Since the major dimension has a length $W_L$ that is larger than the width of channel $W_c$, the ends of the pinch clamp will overlie the front and rear lips 310 and 312 of the rail body 102. Tightening the fastener 420, 422 at this point will draw the pinch clamp 402 against the lower plate 404 of the bracket 106, securely capturing the rail body 102 and affixing it to the vehicle. It will be appreciated that since the rail body 102 has a generally uniform cross section along it's length, the rail body may be moved longitudinally back and forth for alignment purposes simply by loosening the fastener 420, 422. It will not be necessary to completely remove the pinch clamp, rather just loosen it slightly so that the pressure between the pinch clamp 402 and the mounting bracket 106 is reduced somewhat.

Figure 36:
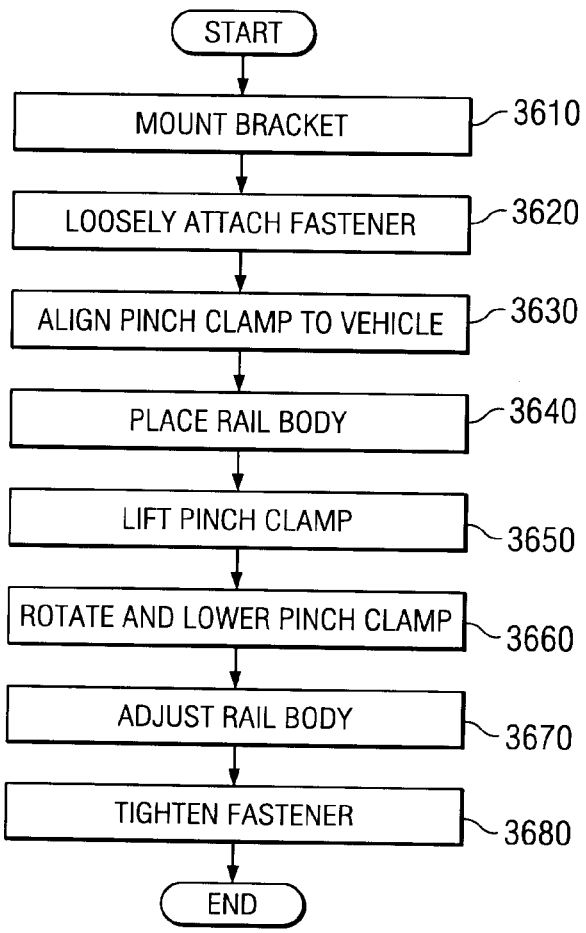
FIG. 36 is a block diagram showing a method of assembling a step rail to a mounting bracket system in accordance with yet another embodiment.

Referring now also to FIG. 36, there is illustrated a block diagram showing a method for mounting a step rail and bracket system to a vehicle in accordance with another embodiment. Beginning at step 3610, the mounting bracket 106 is mounted to a vehicle. At step 3620, a fastener, such as a nut and bolt combination 420 and 422 may be inserted through the fastening holes 414 and 406 and loosely attached to one another to rotatably attach the pinch clamp 402 to the mounting bracket 106. At step 3630, the pinch clamp 402 may then be turned relative to the mounting bracket top plate 404 until the major dimension with length $W_L$ is aligned along the length of the vehicle (i.e., along the length of the channel in the rail body when installed). At step 3640 the rail body 102 may be placed on the lower plate 404 of the bracket 106 such that the major dimension of the pinch clamp 402 with length $W_L$ is within the longitudinal channel 318 between the ends 314 and 316 of the rail body 102. Because the fastener 420, 422 is only loosely fastened, the pinch clamp 402 can be lifted slightly at step 3650 from the surface of plate 404 to keep the first and second portions of the alignment device (in this case, tabs 418 and holes 410) from engaging. At step 3660 the pinch clamp may be rotated approximately 90 degrees and lowered such that the first and second parts of the alignment device are engaged. At step 3670 the fore and aft position of the body rail 102 may be adjusted relative to the vehicle, and at step 3680 the fastener may be tightened.

Referring now again to FIG. 4B, there is shown the mounting bracket system after the pinch clamp 402 has been fully tightened, capturing the rail body 102 between the pinch clamp and the lower plate 404 of the bracket 106. It will be understood that while FIG. 4B illustrates the pinch clamp 402 positioned near the end of the rail body 102, in fact the bracket 106 and clamp 402 may be attached at any point along the rail body 102 since the width of the channel $W_c$ is substantially uniform along the length of the rail body. It will further be appreciated that since the pinch clamp 402 rotates to pass through the channel in the rail body, it is not required that the ends of the rail body 102 be opened during installation. Therefore, the end caps 104 may be installed on the rail body without interfering in any way with the installation of the rail body 102 on the vehicle.

Figure 5:
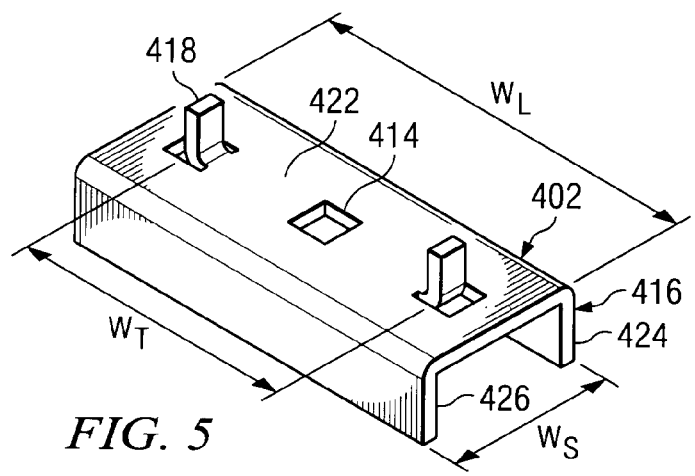
FIG. 5 is a perspective view of the pinch clamp of the step rail and bracket system.

Referring now to FIG. 5, there is illustrated an additional view of the pinch clamp 402. It will be appreciated that the pinch clamp 402 is shown in an inverted position with respect to that shown in FIG. 4A. In this embodiment, the pinch clamp 402 is rectangular having major dimension $W_L$ and minor dimension $W_s$. It will further be appreciated that in this embodiment the pinch clamp 402 has a U-shaped cross section comprising a relatively flat center portion 422 and side rails 424 and 426. This is a simple and strong configuration, however it is not the only configuration that will work. As previously indicated, other configurations having a major and minor dimensions as previously described may be used. The pinch clamp 402 may be pressed, cast, machined, or molded, and may be formed from steel, aluminum, alloys, or another material. In the embodiment of FIG. 5, the first portion 416 of the alignment device comprises tabs 418 separated by the distance $W_t$. As stated, in a preferred embodiment, the width $W_t$ is slightly larger than the width, denoted $W_b$ of the lower plate body 405. The tabs 418 may be pressed, punched, machined, or molded into the relatively flat center portion 422. The tabs 418 represent only an exemplary second part 416 of the alignment device as other devices or methods may be employed. The fastener hole 414 may also be pressed, punched, machined, or molded into the flat center portion 422. In the embodiment shown, the fastener hole 414 is square and designed to cooperate with the bolt 420 (of FIG. 4A), which may have a square neck so as to be self anchoring with respect to the pinch clamp 402.

Figure 6:
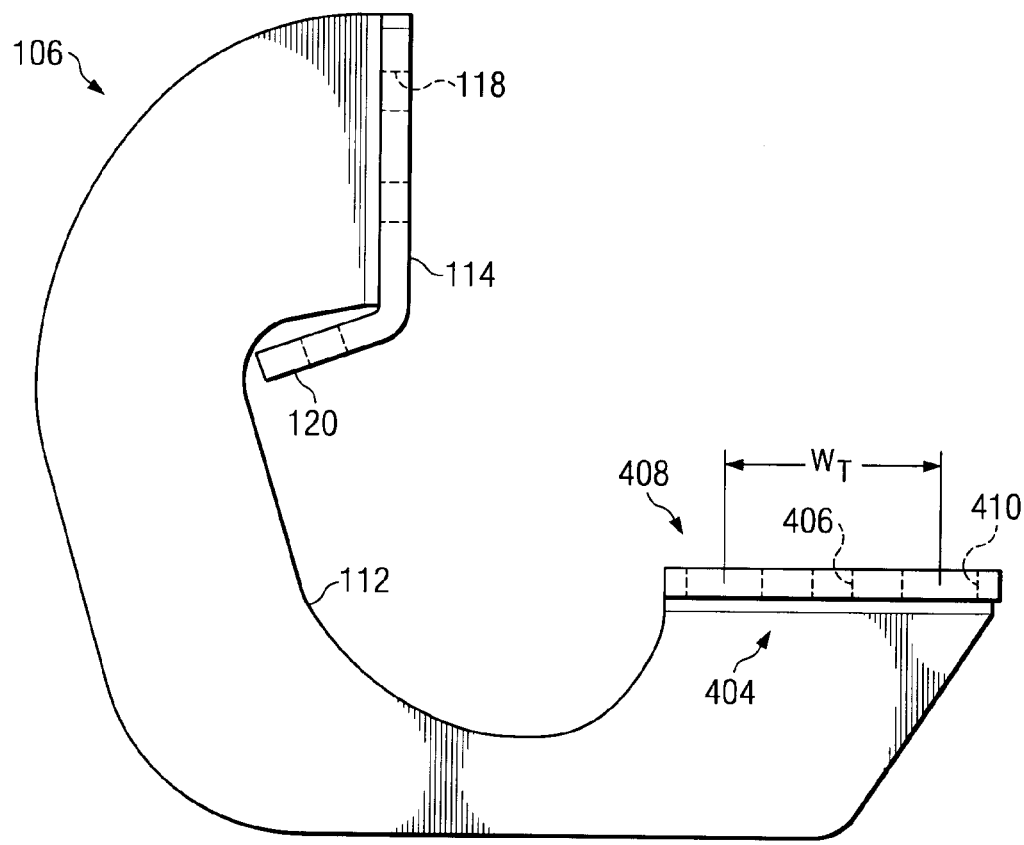
FIG. 6 is a side elevation view of the bracket arm of the step rail and bracket system.

Referring now to FIG. 6, there is illustrated a side view of the mounting bracket 106 to further illustrate various aspects of the invention. The bracket 106 attaches vertically on the upper plate 114 to a vehicle frame, sub-frame, or other suitable mounting point. Holes 118 may be provided at such locations in the upper plate 114 as to match existing holes on the vehicle frame or sub-frame to which the bracket 106 will be mounted to allow the passage of bolts or other fasteners. A lower portion 120 of the upper plate 114 may also be angled to match the vehicle frame or sub-frame and may also be provided with holes for mounting the bracket 106. In some embodiments the lower portion 120 may be angled to provide additional clearance or for aesthetic reasons. Other embodiments may not provide the lower portion 120.

The bracket 106 also provides a lower plate 404 with a relatively flat body 405 which may be oriented in a generally horizontal position by the bracket arm 112. The lower plate body 405 provides the first portion of the alignment device, which, in this embodiment, comprises holes 410. The holes 410 may be the width $W_t$ apart and positioned to match the tabs 422 of FIG. 5. Thus, the pinch clamp 402 may be held in position relative to the lower plate 404 by the use of a single fastener (such as the t422 and bolt 420 of FIGS. 4A-4B) tightly fitted into holes 414 and 406. Additionally, as previously described, the pinch clamp may be only loosely fastened to the lower plate body 405 and may thus remain rotatable when lifted from the lower plate 404. The bracket 106 may be formed from steel, aluminum, alloys thereof, or other materials. The bracket 106 and its associated components and dimensions and may formed by machining, casting, molding, pressing, drilling, punching, and/or combinations of these and other methods.

Referring now to FIGS. 7 through 15, there is illustrated a roll formed step rail in accordance with another embodiment of the invention. The roll formed step rail 800 is substantially identical in most respects to that previously described, including a rail body 802 and end caps 804. In this embodiment, however, step pads 807 and 808 have been added on the upper flat surface of the rail body 802. In the preferred embodiment, the step pads 807 and 808 are mounted after the rail body 802 has been roll formed. The step pads 807 and 808 may be attached with adhesives, fastening studs, or other fastening means to the step rail 802. The step pads 807 and 808 may be made from rubber, plastic, polymers, steel, alloys or other materials. The step pads 807 and 808 may be formed by molding, casting, or other methods. In a preferred embodiment, the step pads 807 and 808 may be formed of a slip resistant material and may be textured so as to increase the slippage resistance.

The end caps 804 may be made from rubber, plastic, polymers, steel, alloys or other materials. The end caps may be formed by molding, casting, or other methods. In the preferred embodiment, the end caps 804 are mounted after the rail body 802 has been formed. The end caps 804 may be attached securely with adhesives, fastening studs or other means. As previously described, the end caps may be installed on the rail body 802 prior to the rail body being attached to the vehicle due to the design of the mounting bracket system 106 and associated components.

FIGS. 10-15 provide various views of the completed step rail. FIG. 10 is a side view illustrating the completed step rail 802 with step pads 807 and 808 and end caps 804. FIGS. 11 and 12 illustrate additional embodiments of the end caps 804 featuring non-slip texturing. FIG. 13 illustrates another side view of the step rail 802 from the back side of the step rail 802 (i.e., the side that faces the vehicle following installation). FIGS. 14 and 15 represent top and bottom view of the finished rail body 802, respectively.

Referring now to FIGS. 16 and 17, additional embodiments of the step rail in accordance with the invention are shown. FIG. 16 shows that the step rail 1600 may have a rail body 1602 of any length, and that two step pads 1607 and 1608 of any size may be used. FIG. 17 shows that step rail 1700 in accordance with other embodiments may have a rail body 1702 of any length and a single step pad 1707 of any length. Each of the step rails 1600 and 1700 may be equipped with end caps 1604 and 1704 similar to those previously described.

Figure 18:
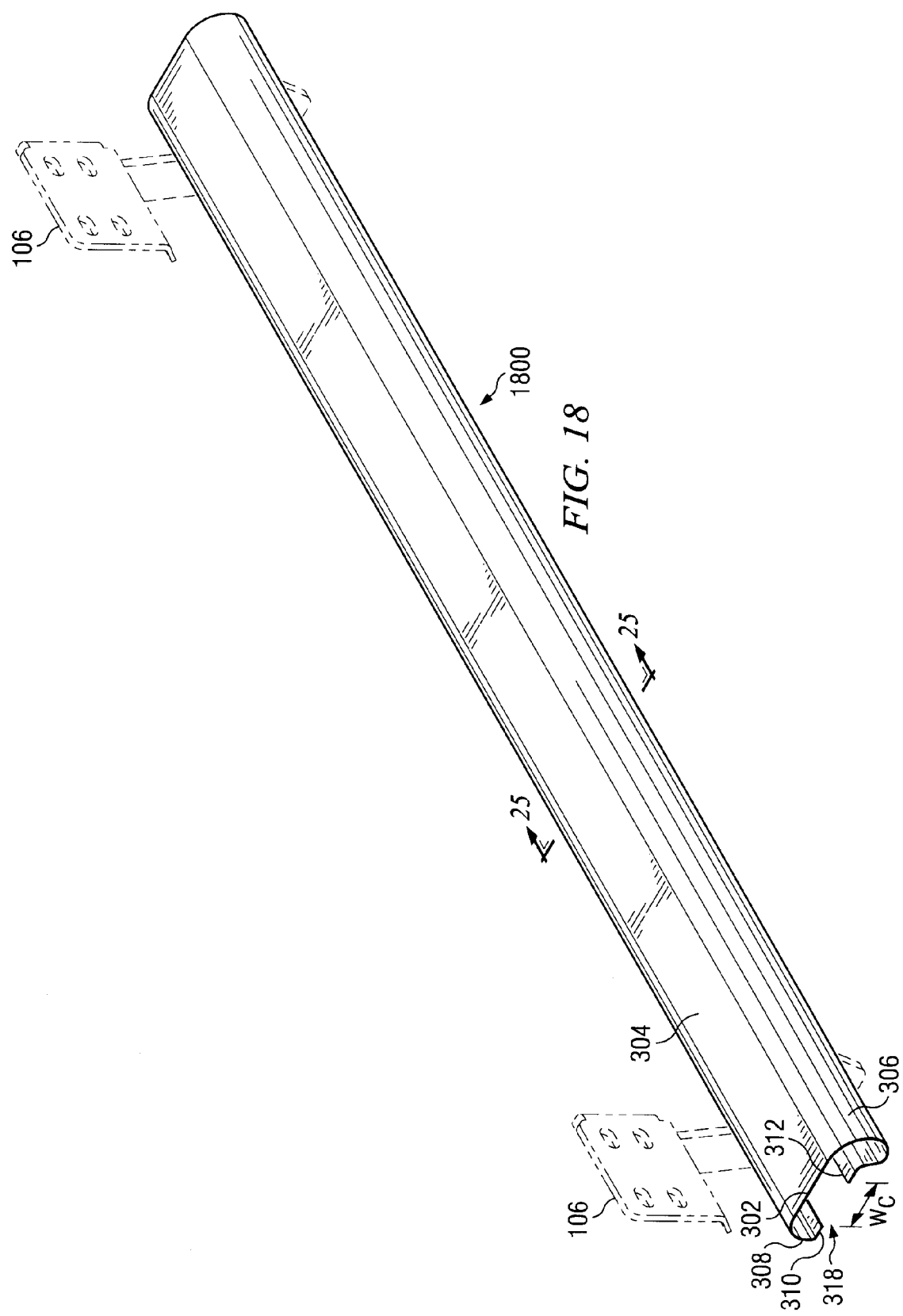
FIG. 18 is a perspective view of a step rail for a vehicle showing as still further embodiment.

Referring now to FIGS. 18-24, a roll formed step rail 1800 in accordance with additional embodiments of the invention is shown. FIG. 18 illustrates a step rail 1800 that is provided without end caps or step pads. The step rail 1800 may be installed and used without end caps or step rails or may serve as an installation base to which items such as end caps and step rails may be added. FIG. 19 illustrates a side view shown from the viewpoint of one facing the installed rail 1800. FIGS. 20 and 21 illustrate the respective end views of the rail 1800. FIG. 22 illustrates the back side of the step rail 1800 (i.e., the side that faces the vehicle following installation). FIGS. 23 and 24 illustrate top and bottom views, respectively.

Referring now to FIGS. 25-32, further embodiments of the invention are shown. The step rail 2600 of FIGS. 25-32 is substantially similar to the step rail 18 of FIGS. 18-24. From FIGS. 25-32 it can be seen that the length of the step rail 2600 may be chosen according to the application and needs of the user or vehicle. FIG. 26 illustrates the installed step rail 2600 while FIG. 25 shows a cross section taken along the line 25 of FIG. 26. FIG. 25 illustrates the cross section of step rails 1800 and 2600. FIG. 27 is a frontal view of the step rail 2600, which may be of any length and FIGS. 28 and 29 provide the respective end views of the step rail 2600. FIG. 30 illustrates the back side of the step rail 2600 (i.e., the side that faces the vehicle following installation). FIGS. 31 and 32 illustrate top and bottom views, respectively.

Figure 33:
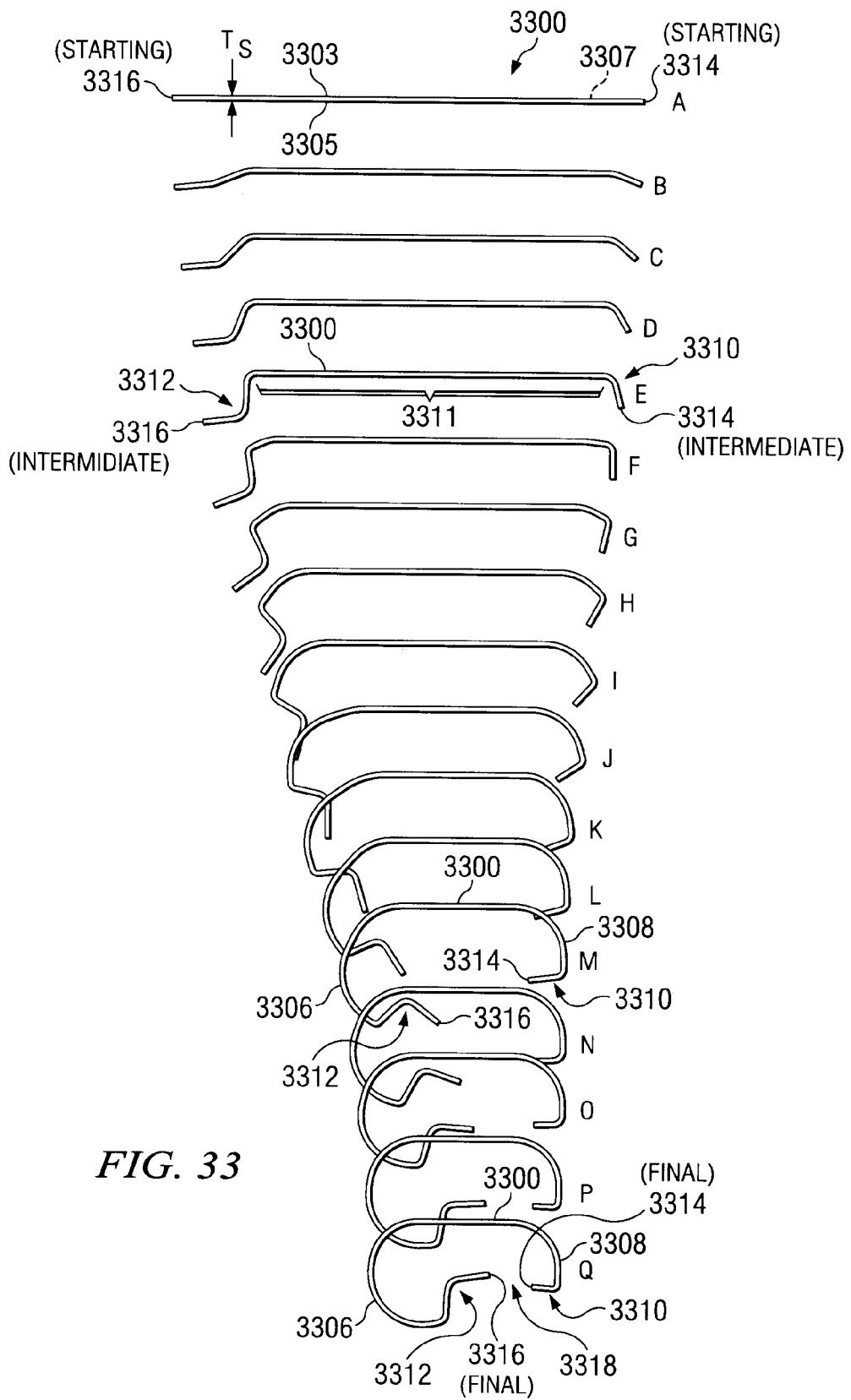
FIG. 33 is a series of sequential end views during the roll forming operation showing successive profiles of the rail body from view A (first profile) to view Q (final profile)
Figure 34:
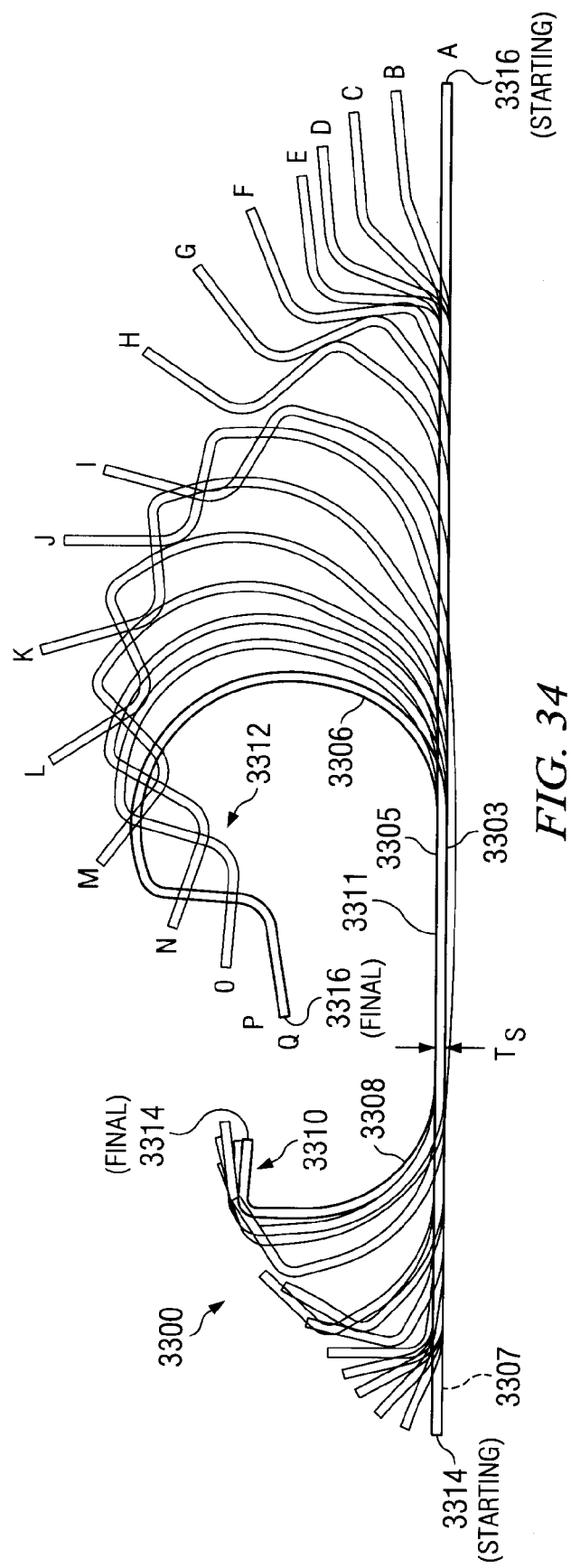
FIG. 34 is an overlaid series of sequential end views of the roll forming operation of FIG. 33 showing the successive profiles of the rail body from view A (first profile) to view Q (final profile) as viewed from a fixed perspective.

Referring now to FIGS. 33 and 34, a roll forming operation for producing the step rail body is described in accordance with yet another embodiment of the invention. FIG. 33 is a sequence of end views of rail profiles produced during the roll forming operation, showing the successive profiles of the rail body, from step A (original profile) to step Q (completed profile). FIG. 34 is an alternative view of the profiles, showing the successive profiles of the rail body from step A to step Q from a fixed perspective.

Referring specifically now to FIG. 33, there is illustrated a sequence of end views (denoted A-Q) of the step rail body showing the sequential deformation of the original sheet during the roll forming process. In view A, the step rail body has the shape of a flat rolled sheet 3300 with a top surface 3303, bottom surface 3305 and free ends 3314 and 3316. Preferably, the flat rolled sheet 3300 is formed of an austenitic stainless steel, more preferably a 304 stainless steel having a nominal composition of 18% chromium and 8% nickel. The flat rolled sheet 3300 has a thickness (denoted $T_s$) which is preferably within the range from 15 gauge to 17 gauge (standard steel thickness) and more preferably 16 gauge. Stated another way, $T_s$ is preferably within the range from about 0.0673 inches to about 0.0538 inches, and more preferably in the range from 0.058 inches to about 0.065 inches.

The top surface 3303 of the sheet 3300 is preferably pre-finished to its final appearance before roll forming. In preferred embodiments the original (i.e., pre-roll formed) top surface 3303 has a brushed finish with a typical surface roughness of Ra 40 micro-inches or less, and more preferably has a No. 4 Finish (ASTM) having a typical surface roughness of Ra 25 micro-inches or less.

Further, in preferred embodiments, the original top surface 3303 of the sheet 3300 is covered by a protective film 3307, which protects the surface finish during roll forming. In more preferred embodiments, the protective film 3307 is a PVC (polyvinyl chloride) film secured to the top surface 3303 with a medium tack adhesive that allows the film to remain attached during roll forming, but can be removed manually thereafter. The protective film 3307 is preferably transparent so that the film and top surface 3303 can be visually inspected for the presence of undesirable debris or contamination before roll forming.

Referring still to FIG. 33, the originally flat sheet 3300 as previously described in View A is passed through a series of roll-forming stages as illustrated in Views B-Q. As is known in the roll-forming industry, each stage of the roll forming line has bending rolls that make a step-wise change to some portion of the cross sectional profile of the sheet 3300, such that the sheet is gradually transformed from the original flat profile shown in View A to the fully formed profile shown in View Q. The changes between adjacent stages are small enough such that the sheet 3300 may be passed continually along the roll forming line without stopping between the original profile (View A) and the completed profile (View Q).

In a preferred embodiment, the initial bending stages (shown by Views B-E) sequentially deform the sheet 3300 beginning at the free ends 3314 and 3316 and forming substantially complete front and rear mounting lips 3312 and 3310 while the center section 3311 remains substantially unchanged (i.e.; flat). Next, the intermediate bending stages (shown by Views F-M) sequentially deform the outer ends of the center section 3311 to substantially form the quarter circular rear curved portion 3308 and simultaneously partially form the semi-circular front curved portion 3306. It will be appreciated that during the intermediate bending stages (Views F-M), the mounting lips 3310 and 3312 are not further deformed; rather their orientation simply changes as they "ride" on the respective curved portions 3308 and 3306, which are being deformed. Next, the final bending stages (shown by Views N-Q) sequentially deform the front curved portion 3306 to its completed step rail configuration as shown in View Q. This final configuration is substantially similar to that previously described herein, e.g., in connection with FIG. 3, and includes all features of the step rail body including the channel 3318 of width $W_c$.

Referring now to FIG. 34, there is illustrated an alternative sequence of end views (similarly denoted Views A-Q) of the rolled sheet 3300 as it is transformed from its original flat rolled configuration (View A) into the completed step rail profile (View Q). The views shown in FIG. 34 are substantially identical to those shown in FIG. 33, with the views denoted using the same letter in the two figures corresponding to one another. In FIG. 34, however, the various views are depicted as if the center portion 3311 of the sheet 3300 was fixed in place. This provides a different perspective to allow further appreciation of the successive bending stages in the roll forming process.

After the sheet 3300 has passed through all stages (Views A-Q) of the roll forming operation, the formed sheet will have a substantially constant cross section of the desired step rail profile as previously described herein, e.g., in connection with FIG. 3. The formed sheet may then be cut to any desired length to form a step rail body. Any protective plastic film may then be removed from the outer surface of the body. Also, step pads and/or end caps may be added to the step rail body as previously described herein, e.g., in connection with FIGS. 7-17. The step rail may be mounted to a vehicle using a bracketing system as previously described herein, e.g., in connection with FIGS. 4A, 4B, 5, 6 and 36.

Figure 35:
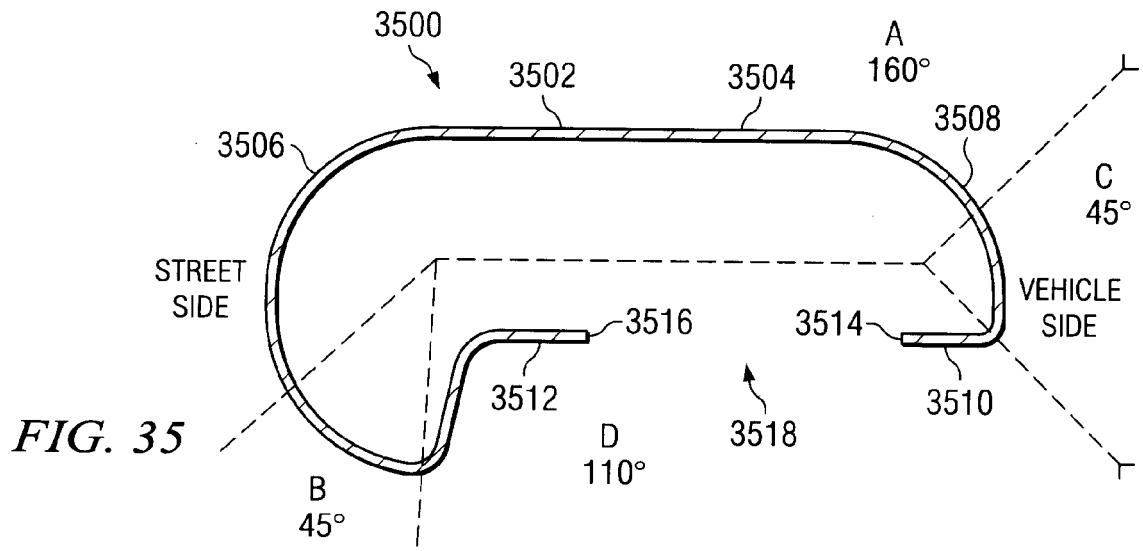
FIG. 35 is a cross-sectional side view of the rail body showing minimum surface finish requirement regions in accordance with another embodiment.

After roll forming, it is preferred, although not required, that the outer surface of the completed step rail exhibit a minimum surface finish that varies according to a position along the periphery of the rail body profile. This surface finish is preferably obtained without additional post-roll forming operations. FIG. 35 illustrates such a minimum surface finish requirement diagram.

Referring now to FIG. 35, there is shown a cross-sectional view of a step rail body after roll forming to form a profile substantially similar to that previously described. The step rail body 3500 has a relatively thin rail wall 3502, a relatively flat top portion 3504 disposed between a semi-circular front curved portion 3506 and a quarter-circular rear curved portion 3508. A rear mounting lip 3510 extends forward from the rear curved portion 3508 and a front mounting lip 3512 extends upwards and then rearwards from the curved front portion 3506. The respective free ends 3514 and 3516 of the front and rear mounting lips are generally in line with one another, but spaced apart as in previously described herein to define a longitudinal mounting passage 3518 having a predetermined width. It is understood, when mounted on the vehicle, the step rail will have the large curved (front) side 3506 facing the street and the small curved (rear) side 3508 facing the vehicle. In this embodiment, the roll forming process provides that, following the removal of any protective plastic film from the outer surface of the rail, the rail's outer surface will have particular minimum surface finish characteristics as follows. A first peripheral segment (denoted A in FIG. 35) subtends approximately 160° angle from the upper rear of curve 3508 to the lower front of curve 3506 as shown. Segment A is the most critical to the appearance of the step rail. Segment A must be substantially blemish-free after roll forming. A second peripheral segment (denoted B) subtends approximately 45° angle from the lower front of curve 3506 to the edge of the front mounting lip 3512 as shown. Segment B is considered to have secondary importance to the appearance of the step rail. Segment B may have only minor to insignificant blemishes after roll forming. A third peripheral segment (denoted C) subtends approximately 45° angle from the upper rear to the lower rear as shown. It has tertiary importance to the appearance of the rail. In segment C, visual blemishes are allowed within a reasonable degree. Finally, a fourth peripheral segment (denoted D) subtends approximately 110° angle from the front mounting lip 3512 to the rear mounting lip 3510 (including the inner surfaces visible through the channel). Segment D is not considered important to the appearance of the rail. In segment D, visual blemishes which do not alter the product dimensions are allowable. Using the roll forming process of the current invention allows such minimum surface finish requirements to be achieved without requiring post roll-forming polishing operations. This has significant advantages in reducing production costs.

It will be appreciated by those skilled in the art having the benefit of this disclosure that this invention provides a roll formed step rail for a vehicle, a mounting bracket system, and process and methods relating to the fabrication and/or use of same. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A step rail assembly for a vehicle, comprising:
   an elongated rail body having two opposing edges defining a longitudinal channel;
   at least one mounting bracket having a first and a second end connected by a bracket arm, the first end adapted for a rigid connection to a mounting point of the vehicle, the second end having a generally upwardly-facing, generally flat mounting surface defining a first fastening hole and a first portion of an alignment device;
   a pinch clamp having a major dimension and a minor dimension disposed on generally perpendicular axes, the pinch clamp defining a second fastening hole and a second portion of the alignment mechanism, the major dimension being greater than a width of the longitudinal channel, the minor dimension being less than the width of the longitudinal channel;
   wherein the second portion of the alignment device is adapted to selectively engage the first portion and thereby prevent relative rotation between the mounting bracket and the pinch clamp when the minor dimension of the pinch clamp is substantially aligned with the longitudinal channel;
   wherein the rail body can be rigidly connected to the mounting bracket by first loosely inserting a fastener through the respective fastening holes in the mounting surface and the pinch clamp to rotatably attach the pinch clamp to the mounting bracket, then turning the pinch clamp to align the major axis with the longitudinal channel, then lowering the rail body toward the mounting bracket such that the pinch clamp passes between the opposing edges of the rail body and the opposing edges come into contact with the mounting surface, then rotating the pinch clamp to align the major axis perpendicular to the longitudinal channel such that the clamp overlies the opposing edges of the rail body and the first portion of the alignment device engages the second portion, and then tightening the fastener to pull the pinch clamp and flat face portion of the bracket arm tightly against opposite sides of the opposing edges of the rail body.

2. The assembly of claim 1, wherein the first portion of the alignment device comprises a plurality of tabs protruding downward from the pinch clamp, and the second portion of the alignment device comprises a plurality of holes defined by the mounting surface, each of the plurality of holes being configured to receive one of the plurality of tabs.

3. The assembly of claim 2, wherein the mounting surface has a width in a direction aligned with the longitudinal channel that is less than a distance between a first tab and a second tab of the plurality of tabs protruding from the pinch clamp.

4. The assembly of claim 1, wherein the first portion of the alignment device comprises a plurality of holes defined in the pinch clamp, and the second portion of the alignment device comprises a plurality of tabs, each of the plurality of holes being configured to receive one of the plurality of tabs.

5. The assembly of claim 1, wherein the fastener cooperates with the second fastening hole to be self anchoring with respect to the pinch clamp.

6. The assembly of claim 1, wherein the elongated rail body substantially conceals the second end of the mounting bracket and the mounting surface when viewed from a direction in the same plane as the opposing edges.

7. The assembly of claim 1, further comprising first and second rail caps attached over first and second ends of the elongated rail body.

8. The assembly of claim 1, further comprising a step pad attached to the outward side of a flat surface defined by the elongated rail body on a side opposite the longitudinal channel.

9. The assembly of claim 1, wherein the second portion of the alignment device selectively engages the generally flat mounting surface of the bracket when the major dimension is aligned with the longitudinal channel thereby preventing rotation between the bracket and pinch clamp.

10. The assembly of claim 9, wherein the second portion of the alignment device comprises tabs projecting downwardly from the pinch clamp and spaced apart a dimension $W_t$, and the generally flat mounting surface of the bracket has a width parallel to the longitudinal channel that is less than $W_t$, whereby the tabs engage the edges of the generally flat mounting surface to prevent relative rotation therebetween when the major dimension is aligned with the longitudinal channel.

* * * * *